US012091980B1

(12) United States Patent
Smoke et al.

(10) Patent No.: US 12,091,980 B1
(45) Date of Patent: Sep. 17, 2024

(54) SPRING BIASED SHROUD RETENTION SYSTEM FOR GAS TURBINE ENGINE

(71) Applicant: HONEYWELL INTERNATIONAL INC., Charlotte, NC (US)

(72) Inventors: Jason Smoke, Phoenix, AZ (US); Courtney Murphy, Phoenix, AZ (US); Timothy Darling, Phoenix, AZ (US); William Weiss, Phoenix, AZ (US); Jeffrey Aitchison, Phoenix, AZ (US); Harry Kington, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/538,434

(22) Filed: Dec. 13, 2023

(51) Int. Cl.
*F01D 11/18* (2006.01)
*F01D 25/24* (2006.01)

(52) U.S. Cl.
CPC ............ *F01D 11/18* (2013.01); *F01D 25/246* (2013.01); *F05D 2240/14* (2013.01); *F05D 2260/38* (2013.01)

(58) Field of Classification Search
CPC ........ F01D 11/18; F01D 11/20; F01D 25/246; F05D 2240/14; F05D 2260/38
See application file for complete search history.

(56) References Cited

U.S. PATENT DOCUMENTS 3,227,418 A * 1/1966 West ....................... F01D 11/22 415/173.1
3,901,622 A 8/1975 Ricketts
5,018,942 A * 5/1991 Ciokajlo ................. F01D 11/22 415/173.2
5,141,394 A 8/1992 Donlan
5,343,694 A 9/1994 Toborg et al.
6,309,177 B1 * 10/2001 Swiderski ............... F01D 11/08 415/173.1
6,733,233 B2 5/2004 Jasklowski et al.
(Continued)

FOREIGN PATENT DOCUMENTS

GB 255605 A 7/1926
JP 2957943 B2 10/1999
(Continued)

OTHER PUBLICATIONS

Patrick Wehrel, Technological Level of CMC Components for Stationary Gas Turbines and Aero-Engines, Dec. 31, 2022.
(Continued)

*Primary Examiner* — Eldon T Brockman
(74) *Attorney, Agent, or Firm* — Lorenz & Kopf LLP

(57) ABSTRACT

A system for coupling a shroud to a case associated with a gas turbine engine includes the case having a mounting pad, and the shroud having a surface that faces the case. The system includes a load spreader having a spreader surface in contact with the surface of the shroud and a locator pin coupled to the mounting pad and the load spreader to couple the shroud to the case. The system includes a load spreader retainer coupled to the load spreader. The load spreader retainer is to distribute a force to the load spreader. The system includes a biasing system coupled about the mounting pad that includes a spring arm configured to apply the force to the load spreader retainer to maintain the spreader surface of the load spreader in contact with the surface of the shroud.

20 Claims, 12 Drawing Sheets

(56) References Cited

U.S. PATENT DOCUMENTS

| | | | | |
|---|---|---|---|---|
| 6,942,203 | B2 | 9/2005 | Schroder et al. | |
| 7,422,413 | B2 | 9/2008 | Matheny | |
| 7,510,374 | B2 | 3/2009 | Meacham | |
| 7,575,409 | B2 * | 8/2009 | Dierksmeier | F01D 11/22 415/173.1 |
| 8,047,773 | B2 | 11/2011 | Bruce et al. | |
| 8,567,202 | B2 | 10/2013 | Heyerman et al. | |
| 8,915,713 | B2 | 12/2014 | Boyer | |
| 9,890,653 | B2 | 2/2018 | Samudrala et al. | |
| 10,184,352 | B2 | 1/2019 | O'Leary et al. | |
| 10,196,973 | B2 | 2/2019 | Kim | |
| 10,392,957 | B2 | 8/2019 | Crutchfield | |
| 10,934,891 | B2 | 3/2021 | Freeman et al. | |
| 10,968,764 | B2 | 4/2021 | Vetters et al. | |
| 11,326,474 | B2 | 5/2022 | Freeman et al. | |
| 11,326,476 | B1 | 5/2022 | Tillman et al. | |
| 11,629,607 | B2 | 4/2023 | Freeman et al. | |
| 2002/0073714 | A1 | 6/2002 | Yim et al. | |
| 2009/0110545 | A1 | 4/2009 | Davis et al. | |
| 2014/0314550 | A1 | 10/2014 | Jenkinson et al. | |
| 2022/0307383 | A1 | 9/2022 | Hayek et al. | |

FOREIGN PATENT DOCUMENTS

| | | | |
|---|---|---|---|
| WO | 2000075492 | A1 | 12/2000 |
| WO | 2018080418 | A1 | 5/2018 |

OTHER PUBLICATIONS

Filip Wasilczuk, Pawel Flaszynski, Lukasz Pyclik, Krzysztof Marugi, Feasibility Study of Fluidic Sealing in Turbine Shroud, Jun. 22, 2021.

* cited by examiner

SPRING BIASED SHROUD RETENTION SYSTEM FOR GAS TURBINE ENGINE

STATEMENT REGARDING FEDERALLY SPONSORED RESEARCH OR DEVELOPMENT

This invention was made with Government support under 693KA9-21-T-00004 awarded by the Federal Aviation Administration. The Government has certain rights in the invention.

TECHNICAL FIELD

The present disclosure generally relates to gas turbine engines, and more particularly relates to a spring biased retention system for a shroud associated with a gas turbine engine.

BACKGROUND

Compressor or turbine rotor blade stages in gas turbine engines may be provided with shrouds to improve engine performance. In certain instances, the shrouds may thermally expand or grow radially at a different rate than surrounding components. In addition, the components coupling the shroud within the gas turbine engine may thermally expand or grow radially at a different rate than the shroud, which may cause these components to move radially relative to the shroud. The movement of these components relative to the shroud may result in wear on the shroud and may impact a life of the shroud.

Accordingly, it is desirable to provide a spring biased retention system for coupling a shroud within a gas turbine engine, which reduces radial movement of the components coupling the shroud during the operation of the gas turbine engine. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

According to various embodiments, provided is a system for coupling a shroud to a case associated with a gas turbine engine. The system includes the case having a mounting pad, and the shroud having a surface that faces the case. The system includes a load spreader having a spreader surface in contact with the surface of the shroud and a locator pin coupled to the mounting pad and the load spreader to couple the shroud to the case. The system includes a load spreader retainer coupled to the load spreader. The load spreader retainer is configured to distribute a force to the load spreader. The system includes a biasing system coupled about the mounting pad that includes a spring arm configured to apply the force to the load spreader retainer to maintain the spreader surface of the load spreader in contact with the surface of the shroud.

The shroud defines a first flange and a second flange that extend from the surface of the shroud, the shroud is composed of a ceramic based material and the load spreader is coupled between the first flange and the second flange. The system includes a lock ring coupled to the locator pin, and the mounting pad includes a wall that inhibits a rotation of the lock ring. The biasing system is a biasing member that defines an opening sized to surround the mounting pad, and includes a clip arm that spans the opening and contacts the lock ring. The clip arm includes a notch configured to receive a portion of the spring arm. The mounting pad includes a wall that has an extension that extends axially from the wall, and the biasing system is coupled about the mounting pad so as to be at least partially retained by the extension. The load spreader is hollow and defines a plenum. The locator pin defines a central cooling bore that is in fluid communication with the plenum and is configured to be coupled to a source of a cooling fluid. The spreader surface defines a plurality of impingement holes configured to direct the cooling fluid onto the surface of the shroud. A retainer pin couples the load spreader retainer to the mounting pad, and the spring arm is configured to apply the force to an end of the retainer pin. The biasing system includes a retainer and an annular biasing member, the retainer is coupled to the lock ring and the annular biasing member includes the spring arm.

Also provided is a gas turbine engine. The gas turbine engine includes a case having a mounting pad, and a shroud having a surface. The gas turbine engine includes a first load spreader having a first spreader surface in contact with the surface of the shroud, and a second load spreader having a second spreader surface in contact with the surface of the shroud. The second load spreader is spaced apart from the first load spreader on the surface of the shroud. The gas turbine engine includes a first locator pin coupled to the mounting pad and the first load spreader to couple the shroud to the case, and a second locator pin coupled to the mounting pad and the second load spreader to couple the shroud to the case. The gas turbine engine includes a load spreader retainer coupled to the first load spreader and the second load spreader. The load spreader retainer is configured to distribute a force to the first load spreader and the second load spreader. The gas turbine engine includes a biasing system coupled about the mounting pad that includes a spring arm configured to apply the force to the load spreader retainer to maintain the first spreader surface of the first load spreader and the second spreader surface of the second load spreader in contact with the surface of the shroud.

The shroud defines a first flange and a second flange that extend from the surface of the shroud, the shroud is composed of a ceramic based material and the first load spreader and the second load spreader are coupled between the first flange and the second flange. The gas turbine engine includes a first lock ring coupled to the first locator pin, a second lock ring coupled to the second locator pin, and the mounting pad includes a pair of walls that inhibit a rotation of the first lock ring and the second lock ring. Each wall of the pair of walls includes an extension that extends axially, and the biasing system is coupled about the mounting pad so as to be at least partially retained by the extension. The biasing system is a biasing member that defines an opening sized to surround the mounting pad, includes a clip arm that spans the opening and contacts the first lock ring and the second lock ring, and the clip arm defines a notch configured to receive a portion of the spring arm.

Further provided is a gas turbine engine. The gas turbine engine includes a case having a mounting pad, and a shroud having a surface. The gas turbine engine includes a load spreader having a spreader surface in contact with the surface of the shroud, and the load spreader is hollow and defines a plenum. The gas turbine engine includes a locator pin coupled to the mounting pad and the load spreader to couple the shroud to the case. The locator pin defines a central cooling bore that is in fluid communication with the plenum and is configured to be coupled to a source of a cooling fluid. The spreader surface defines a plurality of impingement holes configured to direct the cooling fluid onto the surface of the shroud.

The gas turbine engine includes a load spreader retainer coupled to the load spreader, the load spreader retainer configured to distribute a force to the load spreader, and a biasing system coupled about the mounting pad that includes a spring arm configured to apply the force to the load spreader retainer to maintain the spreader surface of the load spreader in contact with the surface of the shroud. The shroud defines a first flange and a second flange that extend from the surface of the shroud, the shroud is composed of a ceramic based material and the load spreader is coupled between the first flange and the second flange. The gas turbine engine includes a lock ring coupled to the locator pin, and the mounting pad includes a wall that inhibits a rotation of the lock ring.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
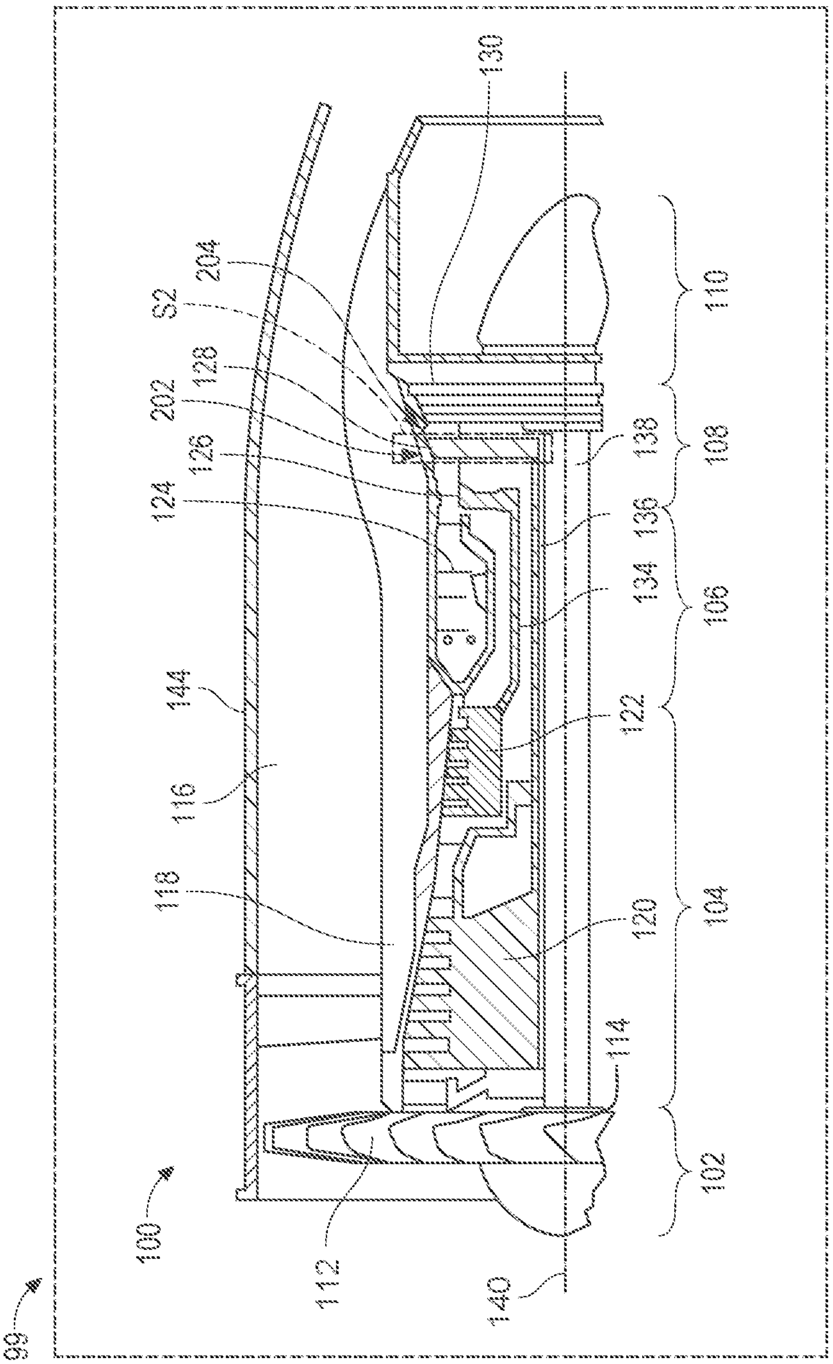
FIG. 1 is a schematic cross-sectional illustration of a gas turbine engine, which includes an exemplary spring biased retention system in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of arrangement that would benefit from a spring biased retention system and the use of the spring biased retention system for coupling a shroud to a case associated with a gas turbine engine described herein is merely one exemplary embodiment according to the present disclosure. In addition, while the spring biased retention system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term “axial” refers to a direction that is generally parallel to or coincident with an axis of rotation, axis of symmetry, or centerline of a component or components. For example, in a cylinder or disc with a centerline and generally circular ends or opposing faces, the “axial” direction may refer to the direction that generally extends in parallel to the centerline between the opposite ends or faces. In certain instances, the term “axial” may be utilized with respect to components that are not cylindrical (or otherwise radially symmetric). For example, the “axial” direction for a rectangular housing containing a rotating shaft may be viewed as a direction that is generally parallel to or coincident with the rotational axis of the shaft. Furthermore, the term “radially” as used herein may refer to a direction or a relationship of components with respect to a line extending outward from a shared centerline, axis, or similar reference, for example in a plane of a cylinder or disc that is perpendicular to the centerline or axis. In certain instances, components may be viewed as “radially” aligned even though one or both of the components may not be cylindrical (or otherwise radially symmetric). Furthermore, the terms “axial” and “radial” (and any derivatives) may encompass directional relationships that are other than precisely aligned with (e.g., oblique to) the true axial and radial dimensions, provided the relationship is predominantly in the respective nominal axial or radial direction. As used herein, the term “about” denotes within 10% to account for manufacturing tolerances. In addition, the term “substantially” denotes within 10% to account for manufacturing tolerances.

With reference to FIG. 1, a partial, cross-sectional view of an exemplary gas turbine engine 100 is shown with the remaining portion of the gas turbine engine 100 being substantially axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, with brief reference to FIGS. 2 and 2A, the gas turbine engine 100 includes a spring biased shroud retention system 200 for coupling a shroud 202 to a casing or engine case 204. In one example, the spring biased shroud retention system 200, the shroud 202 and the engine case 204 are associated with a stage S2 of a turbine section 108 of the gas turbine engine 100 (FIG. 1), however, the spring biased shroud retention system 200, the shroud 202 and the engine case 204 may be associated with other stages of the turbine section 108 and/or a stage of a compressor section 104 of the gas turbine engine 100. As will be discussed, the spring biased shroud retention system 200 maintains the axial and circumferential alignment of the shroud 202 or concentricity of the shroud 202 relative to the engine case 204 even with differences in thermal growth between the shroud 202 and the engine case 204. In addition, the spring biased shroud retention system 200 also ensures that the spring biased shroud retention system 200 remains coupled to the shroud 202 during thermal growth of the shroud 202 and substantially inhibits radial movement of the spring biased shroud retention system 200 relative to the shroud 202 during thermal growth, which reduces wear on the shroud 202.

In this example, with reference back to FIG. 1, the gas turbine engine 100 includes a fan section 102, the compressor section 104, a combustor section 106, the turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined between the inner bypass duct 118 and an outer casing 144. In the embodiment of FIG. 1, the compressor section 104 includes an intermediate pressure compressor 120 and a high-pressure compressor 122. However, in other embodiments, the number of compressors in the compressor section 104 may vary. In the depicted embodiment, the intermediate pressure compressor 120 and the high-pressure compressor 122 sequentially raise the pressure of the air and direct a majority of the high-pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high-pressure air is mixed with fuel, which is combusted. The high-temperature combustion air is directed into the turbine section 108. In this example, the turbine section 108 includes three turbines disposed in axial flow series, namely, a high-pressure turbine 126, an intermediate pressure turbine 128, and a low-pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high-pressure turbine 126 drives the high-pressure compressor 122 via a high-pressure shaft 134, the intermediate pressure turbine 128 drives the intermediate pressure compressor 120 via an intermediate pressure shaft 136, and the low-pressure turbine 130 drives the fan 112 via a low-pressure shaft 138. In this example, the shroud 202 is circumferentially disposed about the intermediate pressure turbine 128, and the engine case 204 is coupled to a portion of a casing associated with the combustor section 106. The spring biased shroud retention system 200 couples the shroud 202 to the engine case 204. The casing associated with the combustor section 106, in turn, may be coupled to the inner bypass duct 118. It should be noted that the placement of the shroud 202 and the engine case 204 about the intermediate pressure turbine 128 is merely exemplary, as the shroud 202, the engine case 204 and the spring biased shroud retention system 200 may be employed with any turbine in the turbine section 108 or compressor in the compressor section 104.

Figure 2:
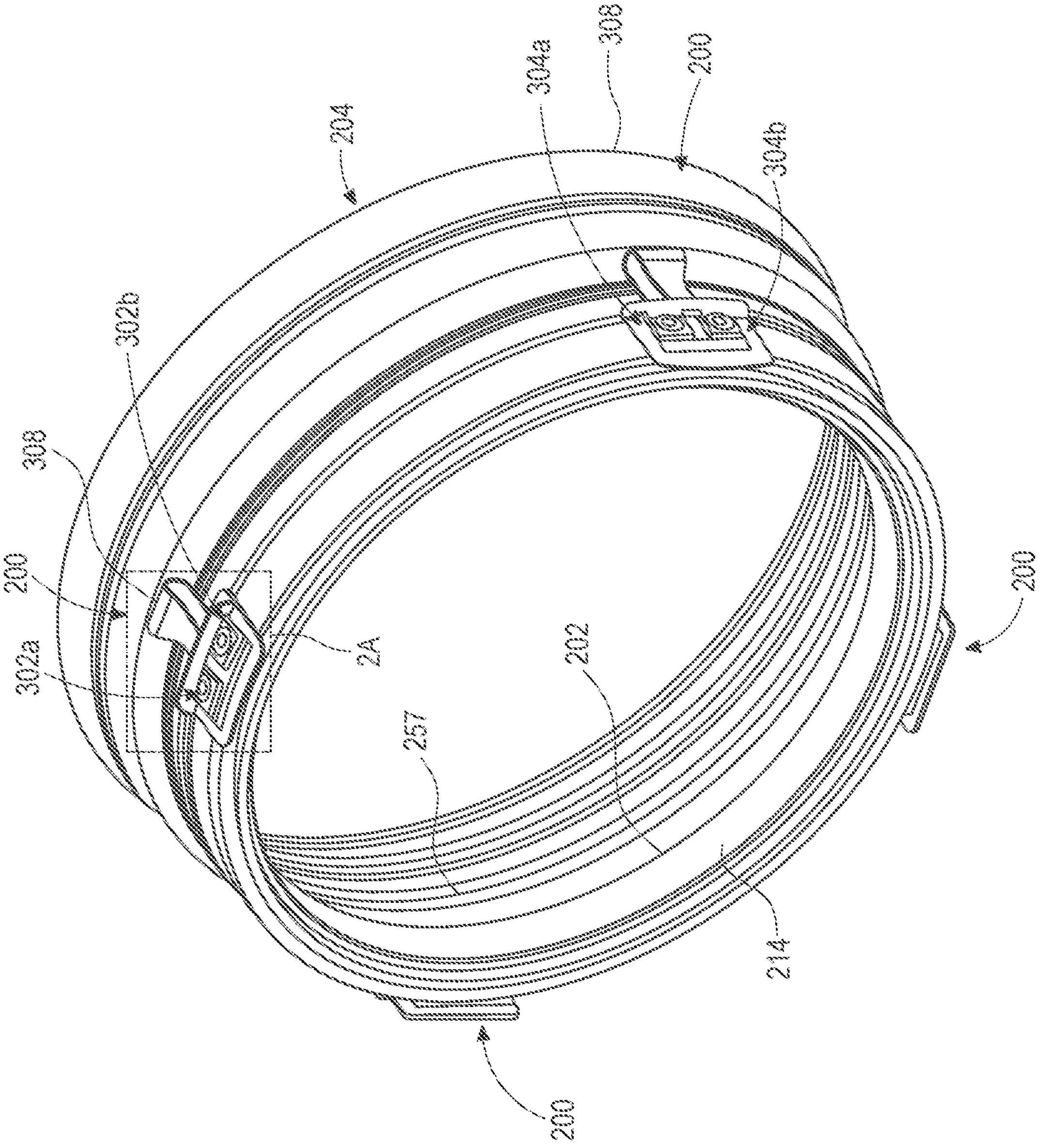
FIG. 2 is a perspective view of the spring biased retention system coupling a shroud to an engine case in accordance with various embodiments.
Figure 3:
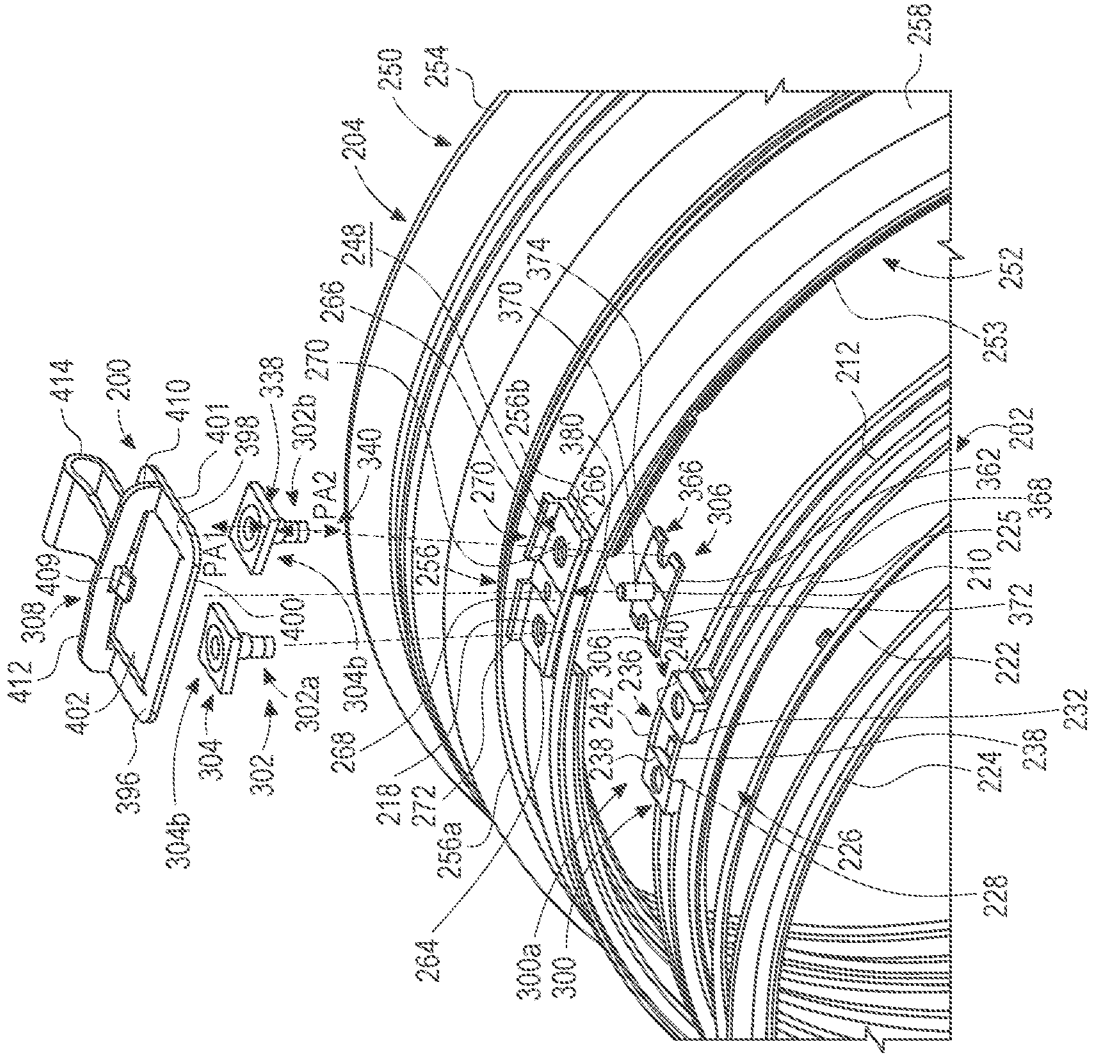
FIG. 3 is a partially exploded view of the spring biased retention system, the shroud and the engine case.

With reference to FIG. 2, a perspective view of the spring biased shroud retention system 200 for coupling the shroud 202 to the engine case 204 is shown. In FIG. 2, the stage of the intermediate pressure turbine 128 is not shown for clarity. In one example, the shroud 202 is annular and surrounds the stage S2 of the turbine section 108, which in this example is the intermediate pressure turbine 128 (FIG. 1). The shroud 202 is composed of any suitable material, such as a metal, metal alloy, composite, polymer-based material, ceramic based material, etc. The shroud 202 may be formed by casting, molding, additive manufacturing, machining, etc. In one example, the shroud 202 is composed of a ceramic based material, which may have a thermal growth rate that is different than a thermal growth rate associated with the engine case 204. For example, the shroud 202 is composed of a ceramic matrix composite. With reference to FIG. 3, the shroud 202 includes a first surface 210 opposite a second surface 212. The first surface 210 defines an inner diameter of the shroud 202, while the second surface 212 defines an outer diameter of the shroud 202. The first surface 210 surrounds a central bore 214 of the shroud 202 (FIG. 2), which is sized to enable the shroud 202 to be positioned about the stage S2 of the turbine section 108 or the intermediate pressure turbine 128 (FIG. 1) at a predefined distance from the rotor blades associated with the intermediate pressure turbine 128. The first surface 210 is generally smooth. The second surface 212 includes a first flange 216 and a second flange 218. The second surface 212 faces the engine case 204.

The first flange 216 extends about an entirety of a perimeter or circumference of the second surface 212. The first flange 216 cooperates with a first seal 222 and a cover ring 224. The first seal 222 seals against the first flange 216 to inhibit the flow of air between the cover ring 224 and the first flange 216. In one example, the first flange 216 is spaced axially inward from a first end of the shroud 202 to define a lip 225. The lip 225 extends about a circumference of the shroud 202, and cooperates with a portion of the cover ring 224. The cover ring 224 encloses an end of the shroud 202 proximate the first flange 216, and assists in retaining the first seal 222 against the first flange 216. In one example, the first flange 216 also includes a plurality of first coupling tabs 226. In this example, the first flange 216 includes four first coupling tabs 226, which are spaced apart about a circumference of the shroud 202 (FIG. 2). Generally, the first coupling tabs 226 are substantially evenly spaced apart about the circumference of the shroud 202 to assist in coupling the spring biased shroud retention system 200 to the shroud 202 so that the spring biased shroud retention system 200 may maintain concentricity of the shroud 202. Each of the first coupling tabs 226 extend radially above a surface of a remainder of the first flange 216 to assist in retaining the spring biased shroud retention system 200 on the shroud 202. In one example, each of the first coupling tabs 226 includes a first side 228 opposite a second side 230, and a first top surface 232, which interconnects the first side 228 with the second side 230. Each of the first side 228, the second side 230 and the first top surface 232 are substantially planar. The first side 228 is spaced apart from the second side 230 for a predetermined distance about the circumference of the shroud 202 to provide spacing for a portion of the spring biased shroud retention system 200.

The first side 228 and the second side 230 are coupled to a portion of the spring biased shroud retention system 200.

The second flange 218 extends about an entirety of a perimeter or circumference of the second surface 212. In one example, the second flange 218 is spaced axially inward from a second end of the shroud 202 to define a second lip 234. The second end of the shroud 202 is opposite the first end in the axial direction, and the first end is a leading edge of the shroud 202, while the second end is downstream and forms a trailing edge for the shroud 202 in a direction of working fluid flow through the gas turbine engine 100. The second lip 234 extends about a circumference of the shroud 202, and cooperates with a portion of the engine case 204. In one example, the second flange 218 also includes a plurality of second coupling tabs 236. In this example, the second flange 218 includes four second coupling tabs 236, which are spaced apart about a circumference of the shroud 202 (FIG. 2). Generally, the second coupling tabs 236 are substantially evenly spaced apart about the circumference of the shroud 202 to assist in coupling the spring biased shroud retention system 200 to the shroud 202 so that the spring biased shroud retention system 200 may maintain concentricity of the shroud 202. Each of the second coupling tabs 236 extend radially above a surface of a remainder of the second flange 218 to assist in retaining the spring biased shroud retention system 200 on the shroud 202. In one example, each of the second coupling tabs 236 includes a third side 238 opposite a fourth side 240, and a second top surface 242, which interconnects the third side 238 with the fourth side 240. Each of the third side 238, the fourth side 240 and the second top surface 242 are substantially planar. The third side 238 is spaced apart from the fourth side 240 for a predetermined distance about the circumference of the shroud 202 to provide spacing for a portion of the spring biased shroud retention system 200. The third side 238 and the fourth side 240 are coupled to a portion of the spring biased shroud retention system 200.

The engine case 204 surrounds the shroud 202 and is fluidly coupled to a source 248 of cooling fluid F. The source 248 of cooling fluid F may comprise any suitable source of cooling fluid F associated with the gas turbine engine 100 including, but not limited to, compressed air received from the compressor section 104. The engine case 204 is composed of any suitable material, such as a metal, metal alloy, composite, etc. In one example, the engine case 204 is composed of a metal alloy, which has a thermal growth rate that is different than the thermal growth rate associated with the shroud 202. For example, the engine case 204 is composed of a nickel alloy, including, but not limited to Nickel Wasapaloy or Nickel Alloy 718. The engine case 204 may be formed by casting, molding, additive manufacturing, machining, etc. The engine case 204 includes a first surface 250 opposite a second surface 252 and a first end 253 opposite a second end 254. The first end 253 is a leading edge of the engine case 204, while the second end 254 is downstream and forms a trailing edge for the engine case 204 in the direction of working fluid flow through the gas turbine engine 100. The first surface 250 defines an inner diameter of the engine case 204, while the second surface 252 defines an outer diameter of the engine case 204. The first surface 250 surrounds a central bore 257 of the engine case 204, which is sized to enable the engine case 204 to be positioned about the shroud 202 (FIG. 2). The engine case 204 also defines a plurality of mounting pads 256 and a first case cover 258.

With continued reference to FIG. 3, each of the mounting pads 256 are defined on the engine case 204. The mounting pads 256 are defined on the second surface 252 of the engine case 204 and proximate or adjacent to the first end 253. In one example, the mounting pads 256 are raised radially from the second surface 252 of the engine case 204 so as to form a substantially rectangular planar platform for coupling the spring biased shroud retention system 200 to the engine case 204. Thus, generally, there is a respective one of the mounting pads 256 for each one of the spring biased shroud retention systems 200 associated with the shroud 202 and engine case 204. In one example, each of the mounting pads 256 includes a first coupling bore 264, a second coupling bore 266, a third coupling bore 268 and a pair of downstream walls 270.

The first coupling bore 264 is defined through the engine case 204 proximate a first side 256*a* of the mounting pad 256. The first side 256*a* is opposite a second side 256*b*. The second coupling bore 266 is defined through the engine case 204 proximate a second side 256*b* of the mounting pad 256. The third coupling bore 268 is defined through the engine case 204 between the first coupling bore 264 and the second coupling bore 266. In this example, the downstream walls 270 extend radially from a downstream end of the mounting pad 256 to define a stop for a portion of the spring biased shroud retention system 200. The downstream walls 270 are spaced apart from each other in the circumferential direction to enable a portion of the spring biased shroud retention system 200 to be positioned between the downstream walls 270. In one example, each of the downstream walls 270 includes a triangular extension 272, which extends axially from the respective downstream wall 270. The triangular extension 272 acts as a lip, and assists in coupling a portion of the spring biased shroud retention system 200 to the engine case 204.

The first case cover 258 surrounds a circumference of the engine case 204. The first case cover 258 is coupled to the triangular extension 272, and an upstream portion of the first case cover 258 is positioned so as to be underneath the triangular extension 272. A portion of the spring biased shroud retention system 200 may contact the first case cover 258.

The spring biased shroud retention system 200 couples the shroud 202 to the engine case 204 such that axial and radial compliance is retained during thermal growth of the shroud 202 and the engine case 204 while reducing wear on the shroud 202. In one example, with reference to FIGS. 3 and 3A, the spring biased shroud retention system 200 includes at least one load spreader 300, at least one locator pin 302, at least one lock ring 304, a load spreader retainer 306 and a biasing system or spring member 308 (FIG. 3).

Figure 3A:
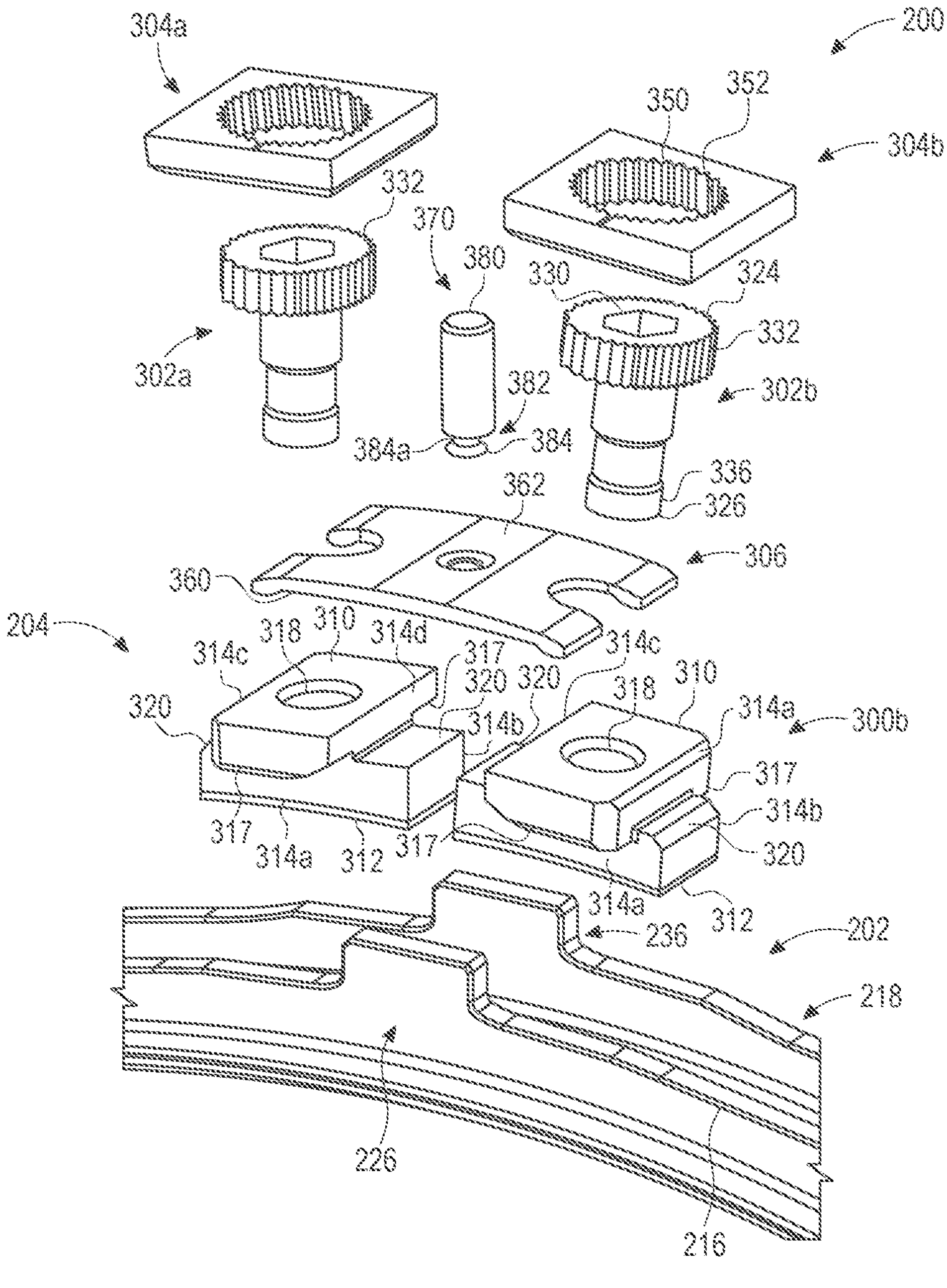
FIG. 3A is an exploded view of a portion of the spring biased retention system from the shroud.
Figure 5:
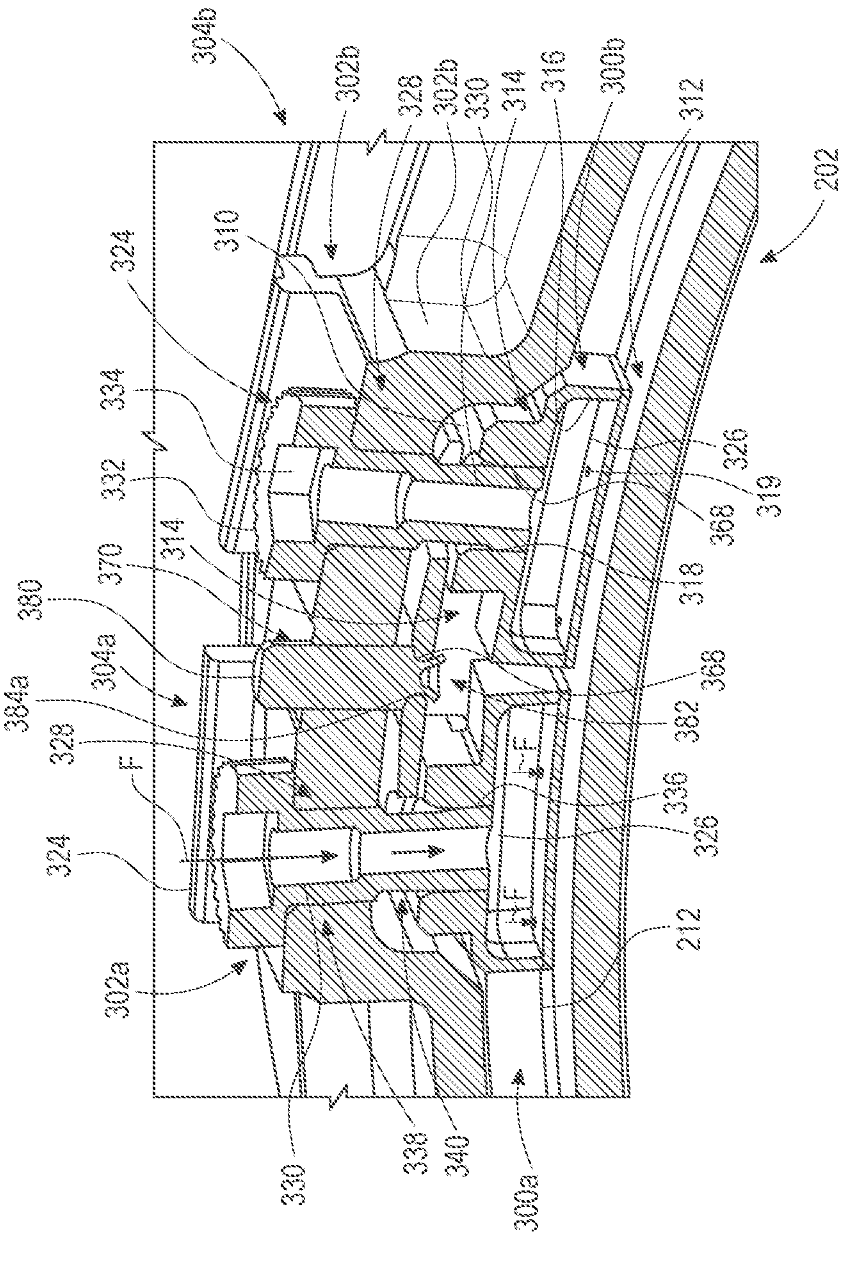
FIG. 5 is a cross-sectional view of the spring biased retention system, the shroud and the engine case taken along line 5-5 of FIG. 2A, in which the lock rings have been removed for clarity.

In this example, the at least one load spreader 300 includes two load spreaders 300*a*, 300*b*, the at least one locator pin 302 includes two locator pins 302*a*, 302*b* and the at least one lock ring 304 includes two lock rings 304*a*, 304*b*. With reference to FIG. 5, each of the load spreaders 300*a*, 300*b* includes a first, top spreader surface 310, a second, bottom spreader surface 312 opposite the top spreader surface 310, a plurality of spreader sidewalls 314 and a spreader plenum 316. In FIG. 5, the lock rings 304*a*, 304*b* and the spring member 308 are removed for clarity. The top spreader surface 310 defines a spreader opening 318. The spreader opening 318 is in fluid communication with the spreader plenum 316. The spreader opening 318 is sized and shaped to receive the respective locator pin 302*a*, 302*b*. The bottom spreader surface 312 is in surface-to-surface contact with the second surface 212 of the shroud 202, and inhibits point loading on the shroud 202, which increases a life of the shroud 202. The bottom spreader surface 312 also defines a plurality of impingement holes 319. The impingement holes 319 direct cooling fluid F received into the spreader plenum 316 to the second surface 212 of the shroud 202. In this example, each of the load spreaders 300*a*, 300*b* is substantially rectangular, and includes four spreader sidewalls 314. The spreader sidewalls 314 interconnect the top spreader surface 310 with the bottom spreader surface 312. With reference to FIG. 3A, two opposed spreader sidewalls 314*a*, 314*b* define a relief 317, which is sized to enable a portion of the spreader sidewalls 314*a*, 314*b* to extend over and be received on the respective one of the first flange 216 and the second flange 218. Two opposed sidewalls 314*c*, 314*d* include a tab 320 that extends from the bottom spreader surface 312 toward the top spreader surface 310. The tabs 320 are generally defined to extend from a plane coplanar with a second pin end 326 of the respective locator pin 302*a*, 302*b* to the bottom spreader surface 312. The tabs 320 extend outwardly from the spreader sidewalls 314*c*, 314*d* and increase a volume of the spreader plenum 316. The tabs 320 also cooperate with the flanges 216, 218 of the shroud 202 to maintain axial and radial compliance during the thermal growth of the shroud 202 relative to the engine case 204. The side of the spreader sidewalls 314*c*, 314*d* devoid of the tabs 320 is in contact with a respective one of the first coupling tabs 226 and the second coupling tabs 236. The spreader plenum 316 is defined internally within each of the load spreaders 300*a*, 300*b*. Generally, the spreader plenum 316 is defined from the spreader opening 318 to the bottom spreader surface 312. The spreader plenum 316 is in fluid communication with the impingement holes 319, and the spreader opening 318. It should be noted that while the load spreaders 300*a*, 300*b* are described and illustrated herein as being hollow and including the spreader plenum 316, in other embodiments, the load spreaders 300*a*, 300*b* may be solid and devoid of a plenum.

Each of the locator pins 302*a*, 302*b* includes a first pin end 324 opposite a second pin end 326, a pin body 328 that interconnects the first pin end 324 with the second pin end 326 and a central pin bore 330. The locator pins 302*a*, 302*b* are composed of metal or metal alloy, and may be cast, forged, additively manufactured, etc. The first pin end 324 is substantially circular, and includes a plurality of pin teeth 332 about an outer perimeter of the first pin end 324. The pin teeth 332 matingly engage with the respective lock ring 304*a*, 304*b* to lock or fix the orientation of the locator pin 302*a*, 302*b* to the respective load spreader 300*a*, 300*b*. The first pin end 324 also defines a tool mating feature 334, such as a hex socket, about a perimeter of the central pin bore 330 at the first pin end 324.

The second pin end 326 is coupled to and received within the spreader opening 318. The second pin end 326 defines a spherical contact surface 336 about an outer perimeter of the second pin end 326. The spherical contact surface 336 cooperates with the spreader opening 318 to create a ball and socket joint, which enables the locator pin 302*a*, 302*b* to move or pivot as needed during the thermal growth of the shroud 202. The pin body 328 is substantially cylindrical and includes a first pin body portion 338 and a second pin body portion 340. The first pin body portion 338 is defined from the first pin end 324 and extends between the first pin end 324 and the second pin body portion 340. The first pin body portion 338 extends along a first axis PA1 (FIG. 3), which is a centerline of the first pin body portion 338. The first pin body portion 338 also has a diameter, which is different and greater than a second diameter of the second pin body portion 340. The second pin body portion 340 is defined from the first pin body portion 338 and extends between the first pin body portion 338 to the second pin end 326. The second pin body portion 340 extends along a second axis PA2 (FIG. 3), which is a centerline of the second pin body portion 340. The second axis PA2 is different than the first axis PA1, and is parallel to and offset from the first axis PA1 (FIG. 3). By providing the first pin body portion 338 with a centerline (first axis PA1) that is offset from the centerline of the second pin body portion 340 (second axis PA2), the locator pins 302*a*, 302*b* act as a cam to accommodate manufacturing tolerances.

The central pin bore 330 is defined through the pin body 328 from the first pin end 324 to the second pin end 326. The central pin bore 330 is defined to extend along the first axis PA1 and the second axis PA2 such that the central pin bore 330 is offset within the pin body 328. The central pin bore 330 is in fluid communication with or fluidly coupled to the source 248 of the cooling fluid F (FIG. 3) to receive the fluid F via one or more conduits, plenums, etc. The central pin bore 330 is also in fluid communication with the spreader plenum 316 such that when the locator pins 302*a*, 302*b* are coupled to the respective load spreader 300*a*, 300*b*, the cooling fluid F flows through the central pin bore 330 of the respective locator pins 302*a*, 302*b* and into the respective spreader plenum 316. From the spreader plenum 316, the cooling fluid F flows through the impingement holes 319 of the bottom spreader surface 312 to cool the second surface 212 of the shroud 202.

Figure 6:
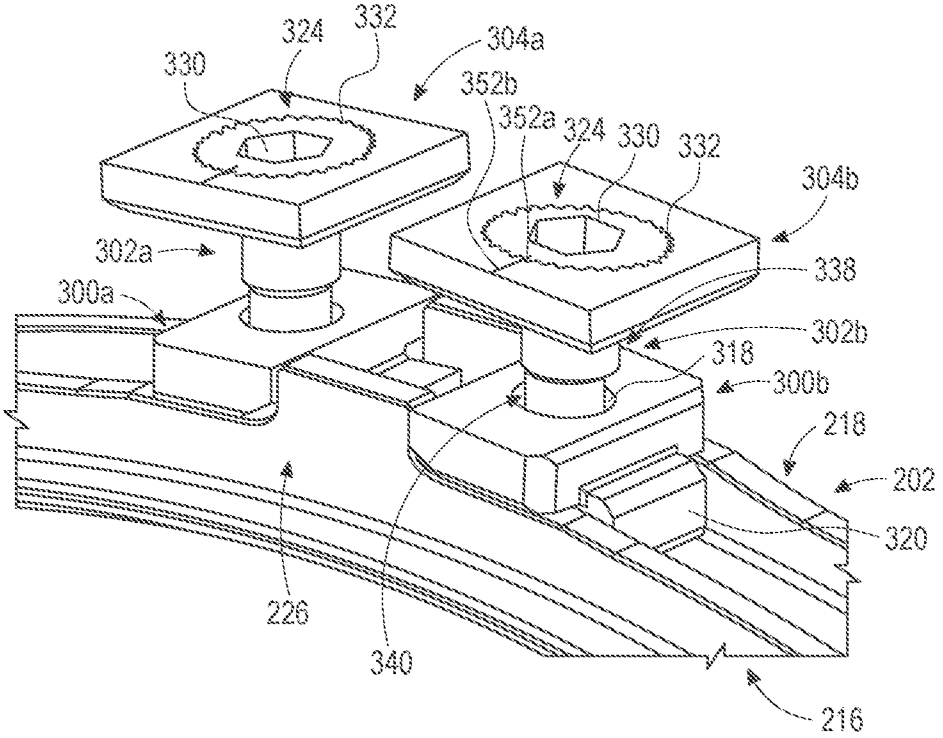
FIG. 6 is a detail view of a portion of the spring biased retention system coupled to the shroud.

With reference to FIG. 6, each of the lock rings 304*a*, 304*b* is coupled to the pin teeth 332 of the respective first pin end 324. In FIG. 6, the engine case 204, the load spreader retainer 306 and the spring member 308 are removed for clarity. Each of the lock rings 304*a*, 304*b* are composed of metal or metal alloy, and may be cast, forged, additively manufactured, etc. Each of the lock rings 304*a*, 304*b* are substantially square, and include a central lock bore 350. The substantially square shape of the lock rings 304*a*, 304*b* cooperates with the downstream walls 270 to form an anti-rotation feature that inhibits the rotation of the lock rings 304*a*, 304*b* relative to the load spreaders 300*a*, 300*b*. The central lock bore 350 includes a plurality of lock teeth 352 about a perimeter or circumference of the central lock bore 350, which matingly engage with the pin teeth 332 of the respective locator pin 302*a*, 302*b*. In one example, each of the locator pins 302*a*, 302*b* include about 33 of the pin teeth 332. The lock teeth 352 enable the rotational adjustment of the locator pins 302*a*, 302*b*, which act as a cam to orientate the load spreaders 300*a*, 300*b* on the shroud 202. In one example, a clockwise rotation of the locator pin 302*a*, 302*b*, moves the bottom spreader surface 312 into contact with the second surface 212 of the shroud 202. A counter-clockwise rotation of the locator pin 302*a*, 302*b*, moves the bottom spreader surface 312 away from contact with the second surface 212 of the shroud 202. In this example, corresponding notches 352*a*, 352*b* formed on the first pin end 324 of the locator pin 302*a*, 302*b* and a first surface of the lock ring 304*a*, 304*b*, respectively, visually identify a null position.

With reference to FIG. 3, the load spreader retainer 306 is substantially a rectangular plate, and is substantially flat or planar. The load spreader retainer 306 is composed of a metal or metal alloy, and may be cast, forged, stamped, machined, additively manufactured, etc. The load spreader retainer 306 includes a first retainer surface 360 opposite a second retainer surface 362, a first retainer end 364 opposite a second retainer end 366, and a retainer bore 368. A retainer pin 370 is coupled to the load spreader retainer 306 to transfer the force applied by the spring member 308 to the load spreader retainer 306, which transfers the force to the load spreaders 300*a*, 300*b*.

The first retainer surface 360 is positioned adjacent to the engine case 204 when the spring biased shroud retention system 200 is coupled to the engine case 204. The second retainer surface 362 is coupled to and in contact with the top spreader surface 310 of each of the load spreaders 300*a*, 300*b* when the spring biased shroud retention system 200 is assembled to the shroud 202 and the engine case 204. The first retainer end 364 defines a first cutout 372, which is substantially semi-circular. The first cutout 372 is sized and shaped to be positioned about a portion of the perimeter of the second pin body portion 340 (FIG. 5) of the locator pin 302*a*. The second retainer end 366 defines a second cutout 374, which is substantially semi-circular. The second cutout 374 is sized and shaped to be positioned about a portion of the perimeter of the second pin body portion 340 of the locator pin 302*b* (FIG. 5). The retainer bore 368 is defined through the first retainer surface 360 and the second retainer surface 362. The retainer bore 368 is generally defined to be centered between the first retainer end 364 and the second retainer end 366.

The retainer pin 370 couples the load spreader retainer 306 to the engine case 204, and is coupled to the spring member 308. The retainer pin 370 is composed of metal or metal alloy, and may be cast, forged, machined, additively manufactured, etc. The retainer pin 370 is substantially cylindrical, and has a first retainer pin end 380 opposite a second retainer pin end 382 (FIG. 5). With reference to FIG. 5, the first retainer pin end 380 is substantially flat or planar, and is coupled to and in contact with a portion of the spring member 308 when the spring member 308 is coupled to the engine case 204. The first retainer pin end 380 transfers the force from the spring member 308 to the load spreader retainer 306 such that the second retainer surface 362 applies a force to the load spreaders 300*a*, 300*b* to maintain the load spreaders 300*a*, 300*b* in contact with the shroud 202. The second retainer pin end 382 includes a flange 384. In one example, the flange 384 has a substantially frustoconical shape and is hollow, with a base of the flange 384 defined at the second retainer pin end 382 and tapering to a vertex 384*a* that is spaced a distance apart from the second retainer pin end 382. The vertex 384*a* defines a recessed portion about the circumference of the retainer pin 370, which is sized to receive the sidewalls of the retainer bore 368. The substantially frustoconical shape of the flange 384 assists in retaining the retainer pin 370 within the retainer bore 368 such that the retainer pin 370 and the load spreader retainer 306 are coupled to the retainer pin 370 to move with the retainer pin 370.

Figure 2A:
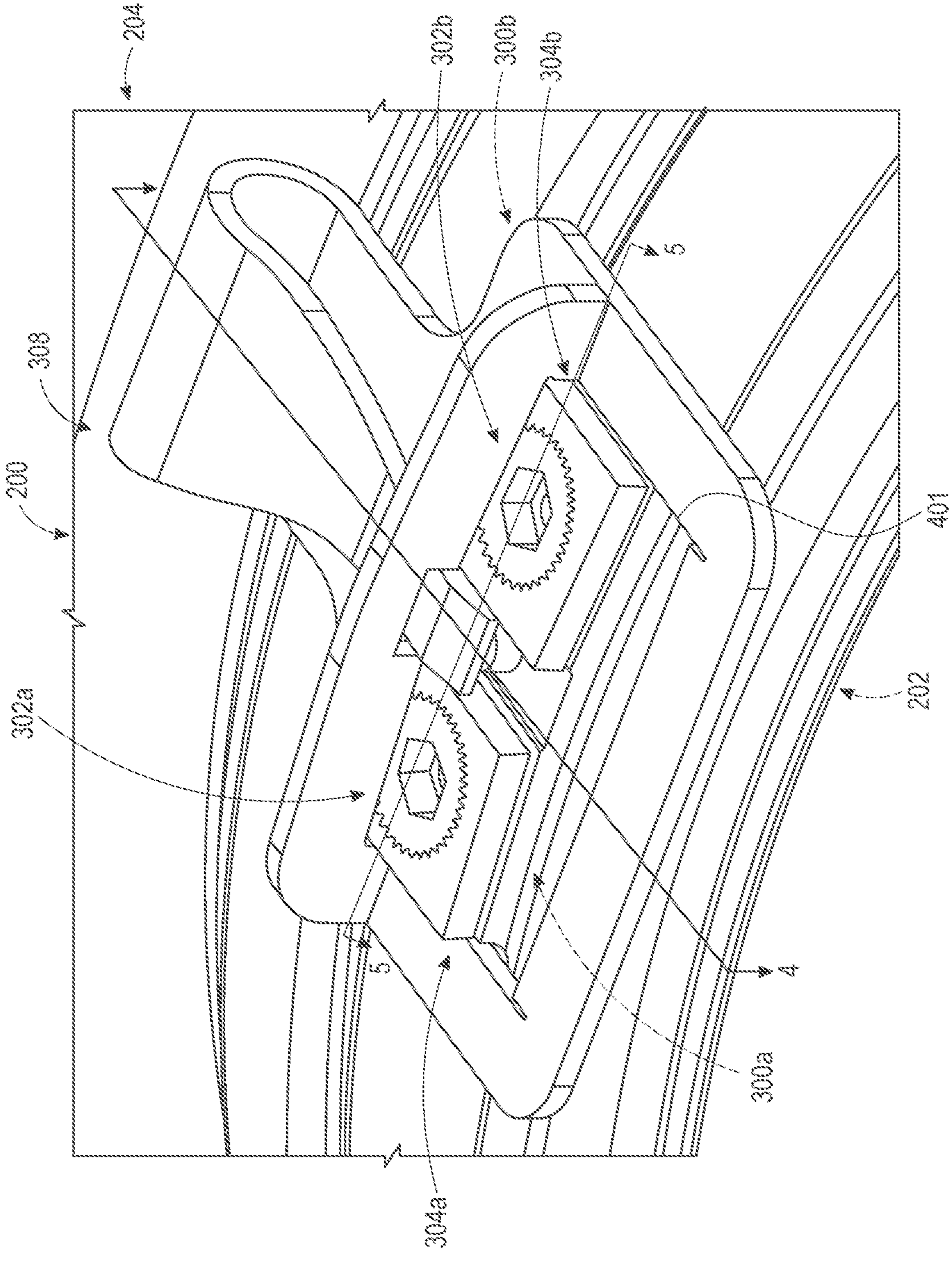
FIG. 2A is a detail view of the spring biased retention system of FIG. 2, taken at 2A on FIG. 2.

With reference to FIG. 2A, the spring member 308 is sized and shaped to surround the lock rings 304*a*, 304*b* and to bias against the lock rings 304*a*, 304*b* to ensure contact between the load spreaders 300*a*, 300*b* during the thermal growth of the shroud 202. In one example, the spring member 308 is a spring clip. The spring member 308 is composed of metal or metal alloy, and may be cast, forged, additively manufactured, etc. With reference to FIG. 3, the spring member 308 includes a clip base 390, a clip arm 392 and a biasing member or spring arm 394. The clip base 390 and the spring arm 394 define an opening 401. The opening 401 is sized to surround the lock rings 304*a*, 304*b*, and has a closed perimeter.

The clip base 390 is substantially U-shaped, and includes a first base arm 396, a second base arm 398 and a third base arm 400. The clip base 390 is generally sized and shaped to surround a respective one of the mounting pads 256. The first base arm 396, the second base arm 398 and the third base arm 400 are integrally formed in this example. Each of the first base arm 396, the second base arm 398 and the third base arm 400 are substantially L-shaped in cross-section, and include a lip 402 that extends radially from each of the first base arm 396, the second base arm 398 and the third base arm 400 proximate the lock rings 304*a*, 304*b*. The first base arm 396 is opposite the second base arm 398. The first base arm 396 is positioned adjacent to the lock ring 304*a*, while the second base arm 398 is positioned adjacent to the lock ring 304*b*. The first base arm 396 and the second base arm 398 are coupled to the third base arm 400 at one end, and are coupled to the spring arm 394 at an opposite, second end. The third base arm 400 interconnects the first base arm 396 and the second base arm 398.

The clip arm 392 is coupled to the first base arm 396 and the second base arm 398 so as to be spaced apart from the second end of the respective one of the first base arm 396 and the second base arm 398. The clip arm 392 extends axially or above the surface of the first base arm 396 and the second base arm 398, and spans the opening 401. The clip arm 392 is in contact with the lock rings 304*a*, 304*b* when the spring member 308 is coupled to the engine case 204. The clip arm 392 provides rigidity to the clip base 390, and also defines a notch 404. The notch 404 is defined so as to be centered on the clip arm 392 and aligned with a portion of the spring arm 394.

Figure 4:
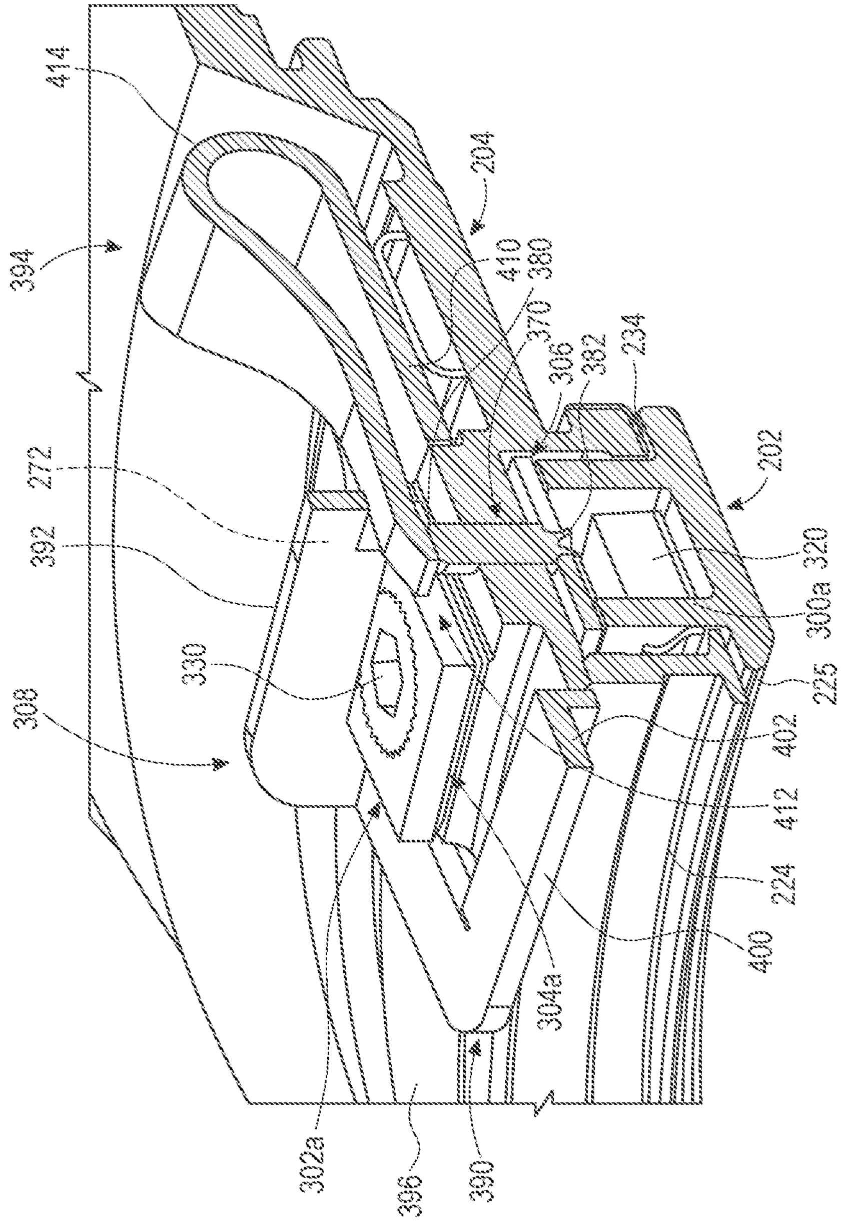
FIG. 4 is a cross-sectional view of the spring biased retention system, the shroud and the engine case taken along line 4-4 of FIG. 2A.

The spring arm 394 applies a spring force to the retainer pin 370, which imparts a force to the load spreader retainer 306 during the thermal growth of the shroud 202. The load spreader retainer 306, in turn, imparts a force onto the load spreaders 300*a*, 300*b* to maintain contact between the load spreaders 300*a*, 300*b* and the shroud 202. In one example, the spring arm 394 includes a first spring end 410, a second spring end 412 and a biasing or spring portion 414. The first spring end 410 is coupled to the first base arm 396 and the second base arm 398 to enclose the opening 401. The second spring end 412 is received through the notch 404 defined in the clip arm 392. The second spring end 412 has a width, which is different and less than a width of the first spring end 410. Generally, with reference to FIG. 4, the second spring end 412 is sized to be positioned between the lock rings 304*a*, 304*b*, and to have surface to surface contact with the first retainer pin end 380 of the retainer pin 370. The spring portion 414 is curved to interconnect the first spring end 410 with the second spring end 412. Generally, the spring member 308 is coupled to the engine case 204 with a snap-fit, and the first spring end 410 is forced over the triangular extensions 272. The triangular extensions 272 hold the first spring end 410 with the engine case 204 as the second spring end 412 is coupled to the shroud 202 via the load spreader retainer 306. The spring portion 414 applies a spring force to the first retainer pin end 380 via the second spring end 412. A radial movement of the load spreaders 300*a*, 300*b* is inhibited by the spring force applied by the spring portion 414 to the load spreader retainer 306 and further by contact between the spring portion 414 and the notch 404. By inhibiting the radial movement of the load spreaders 300*a*, 300*b*, wear on the second surface 212 of the shroud 202 is reduced.

In order to couple the shroud 202 to the engine case 204, in one example, with reference to FIGS. 3 and 5, the load spreaders 300*a*, 300*b* may be inserted on opposed sides of the first coupling tabs 226 and the second coupling tabs 236 such that the load spreaders 300*a*, 300*b* are positioned at about 0 degrees, about 90 degrees, about 180 degrees and about 270 degrees about the circumference of the shroud 202 from a top center of the shroud 202. With the retainer pin 370 coupled to the load spreader retainer 306, the load spreader retainer 306 may be positioned over the load spreaders 300*a*, 300*b*. With the spreader openings 318 coaxially aligned with the respective one of the coupling bores 264, 266, and the retainer pin 370 coaxially aligned with the third coupling bore 268, the shroud 202 and the load spreaders 300*a*, 300*b* may be coupled to the engine case 204 such that the retainer pin 370 is received through the third coupling bore 378. The locator pins 302*a*, 302*b*, are coupled to the respective one of the coupling bores 264, 266 so as to extend through the respective one of the coupling bores 264, 266, through the cutouts 372, 374 and into the respective spreader openings 318. The lock rings 304*a*, 304*b* are coupled to the locator pins 302*a*, 302*b* and rotated to position the respective load spreader 300*a*, 300*b* in contact with the second surface 212 of the shroud 202. Once the load spreaders 300*a*, 300*b* are in the proper orientation such that surface to surface contact is defined between the bottom spreader surface 312 and the second surface 212, the lock rings 304*a*, 304*b* are positioned into contact with the downstream walls 270 such that the downstream walls 270 inhibit the rotation of the lock rings 304*a*, 304*b*. With the first case cover 258 coupled to the engine case 204, the spring member 308 is coupled about the lock rings 304*a*, 304*b* such that the first spring end 410 is received under the triangular extensions 272 and the second spring end 412 is coupled to or in contact with the first retainer pin end 380. The first seal 222 and the cover ring 224 may be coupled to the shroud 202.

Figure 7:
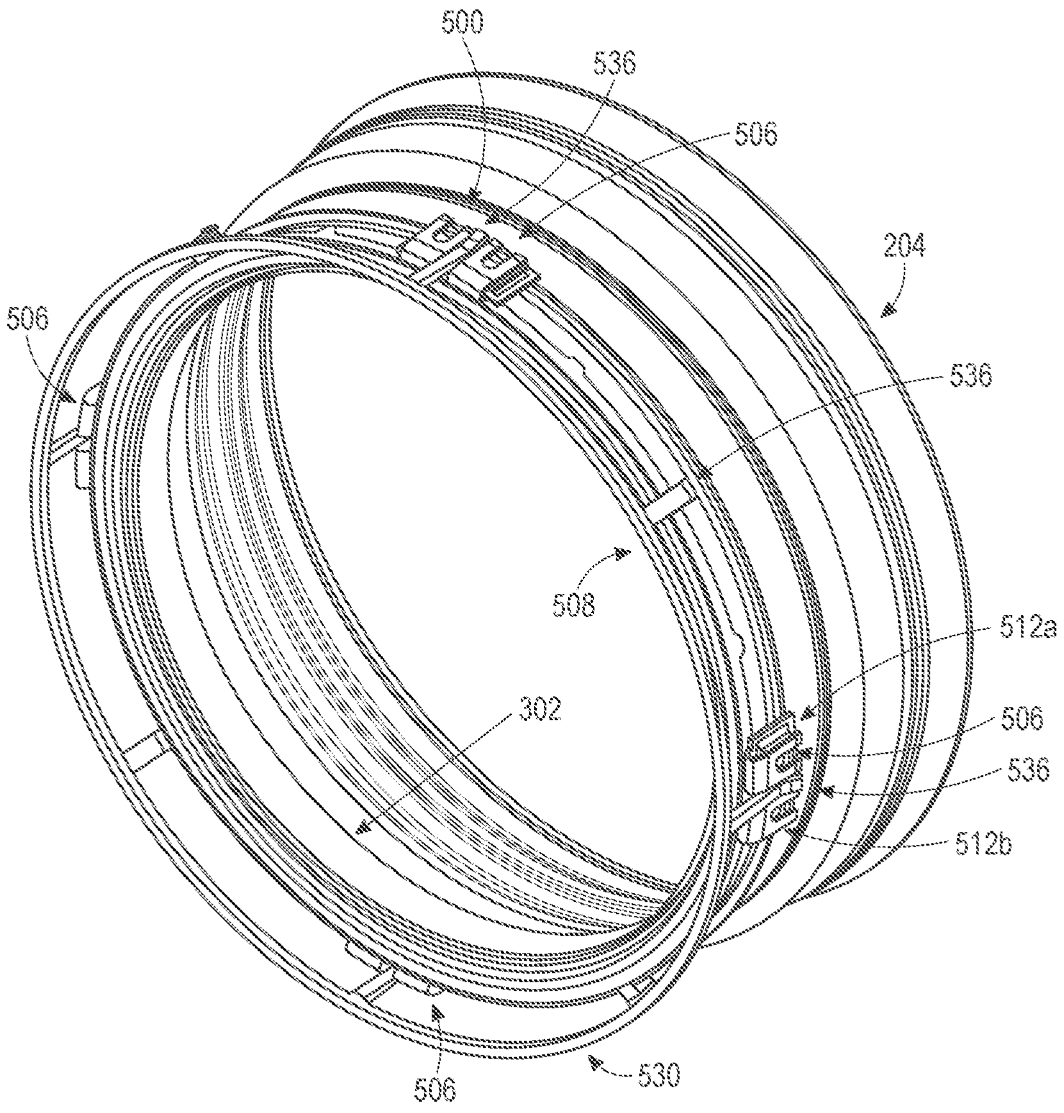
FIG. 7 is a perspective view of another exemplary spring biased retention system for coupling the shroud to the engine case in accordance with various embodiments.

It should be noted that while the spring biased shroud retention system 200 is described herein as including the spring member 308 to maintain the axial position of the load spreaders 300*a*, 300*b* during thermal growth, the spring biased shroud retention system 200 may be configured differently maintain the axial position of the load spreaders 300*a*, 300*b*. In one example, with reference to FIG. 7, a spring biased shroud retention system 500 is shown. As the spring biased shroud retention system 500 includes components that are the same or similar to components of the spring biased shroud retention system 200 discussed with regard to FIGS. 1-6, the same reference numerals will be used to denote the same or similar components. In one example, the spring biased shroud retention system 500 couples the shroud 202 to the engine case 204 such that axial and radial compliance is retained during thermal growth of the shroud 202 and the engine case 204 while reducing wear on the shroud 202. In one example, with additional reference to FIG. 8, the spring biased shroud retention system 500 includes the load spreaders 300*a*, 300*b*, the locator pins 302*a*, 302*b*, the lock rings 304*a*, 304*b*, the load spreader retainer 306, a biasing system or a retainer 506 and a spring member 508.

Figure 9:
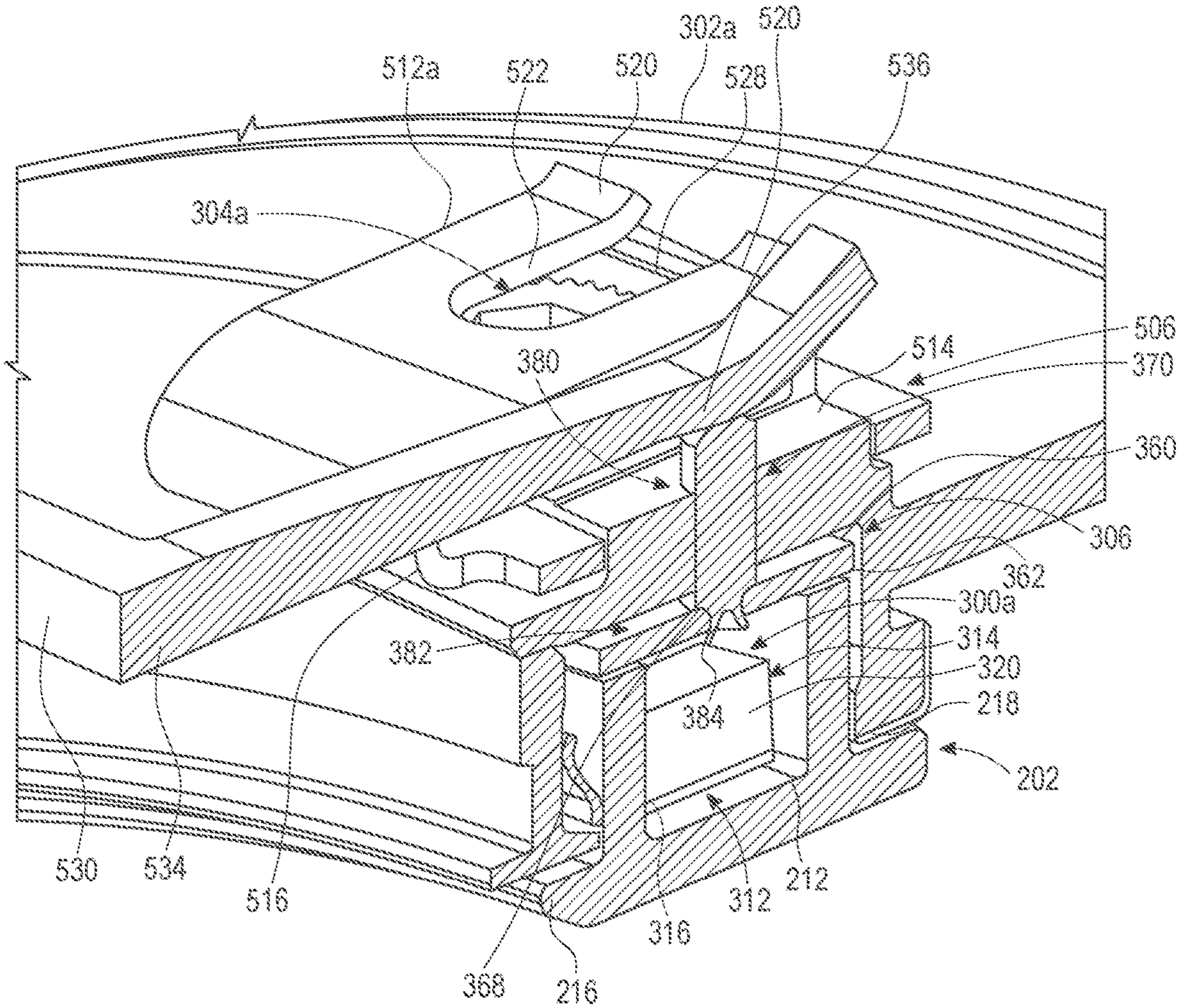
FIG. 9 is a cross-sectional view of the spring biased retention system, the shroud and the engine case taken along line 9-9 of FIG. 10.

With reference to FIG. 9, each of the load spreaders 300*a*, 300*b* includes the top spreader surface 310, the bottom spreader surface 312, the plurality of spreader sidewalls 314 and the spreader plenum 316. The top spreader surface 310 defines the spreader opening 318. The bottom spreader surface 312 is in surface-to-surface contact with the second surface 212 of the shroud 202. The bottom spreader surface 312 also defines the plurality of impingement holes 319. The spreader sidewalls 314*a*, 314*b* define the relief 317, which is sized to enable a portion of the spreader sidewalls 314*a*, 314*b* to extend over and be received on the respective one of the first flange 216 and the second flange 218. Two opposed sidewalls 314*c*, 314*d* include the tab 320 that extends from the bottom spreader surface 312 toward the top spreader surface 310. It should be noted that while the load spreaders 300*a*, 300*b* are described and illustrated herein as being hollow and including the spreader plenum 316, in other embodiments, the load spreaders 300*a*, 300*b* may be solid and devoid of a plenum.

Figure 8:
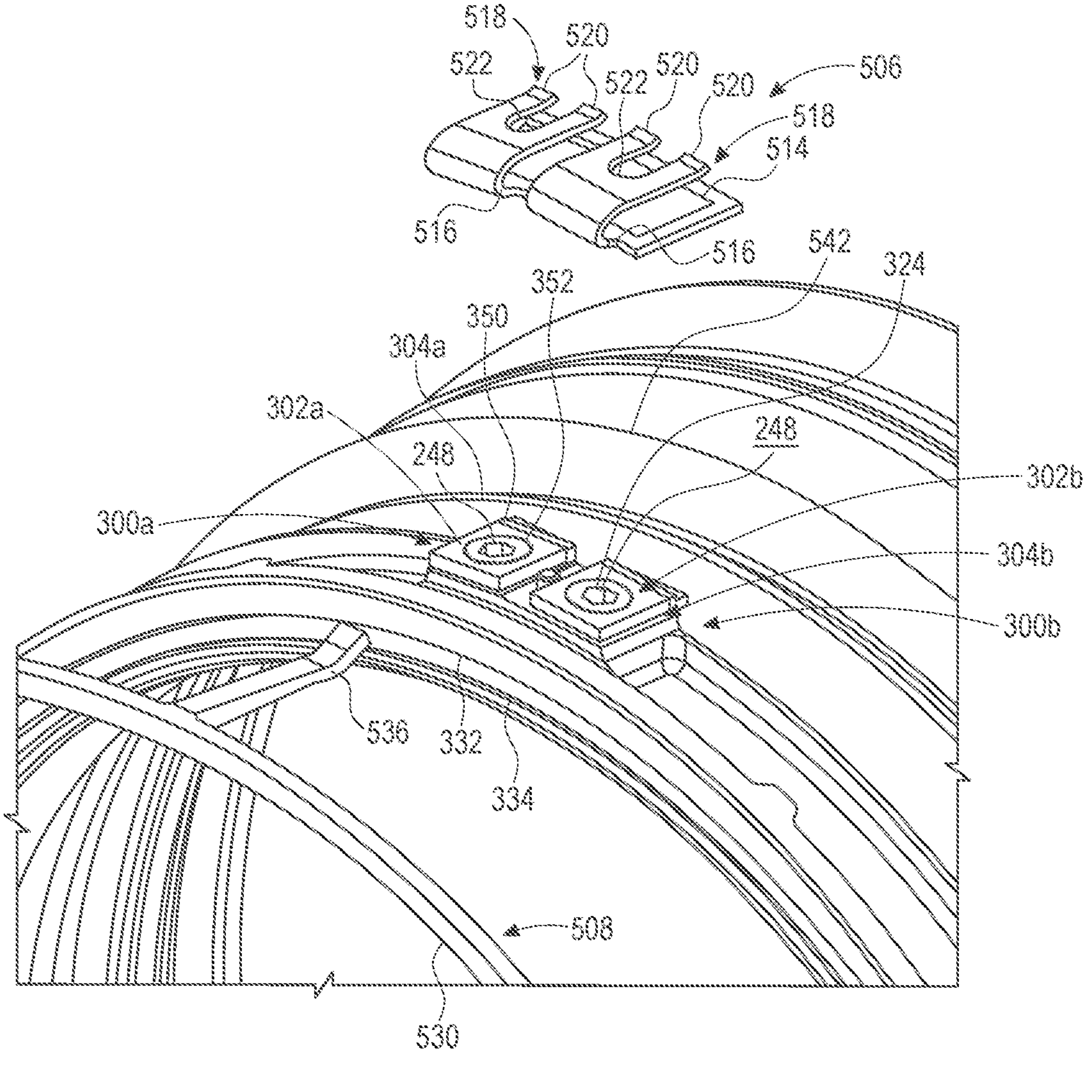
FIG. 8 is a partially exploded view of the spring biased retention system, the shroud and the engine case of FIG. 7.

With reference to FIG. 8, each of the locator pins 302*a*, 302*b* includes the first pin end 324, the second pin end 326, the pin body 328 and the central pin bore 330. The plurality of pin teeth 332 matingly engage with the respective lock ring 304*a*, 304*b* to lock or fix the orientation of the locator pin 302*a*, 302*b* to the respective load spreader 300*a*, 300*b*. The first pin end 324 also defines the tool mating feature 334.

The second pin end 326 is coupled to and received within the spreader opening 318. The second pin end 326 defines the spherical contact surface 336 that cooperates with the spreader opening 318 to create the ball and socket joint. The pin body 328 includes the first pin body portion 338 and the second pin body portion 340. The central pin bore 330 is defined through the pin body 328 and is in fluid communication with or fluidly coupled to the source 248 of the cooling fluid F to receive the fluid F via one or more conduits, plenums, etc. The central pin bore 330 is also in fluid communication with the spreader plenum 316.

Each of the lock rings 304*a*, 304*b* is coupled to the pin teeth 332 of the respective first pin end 324. Each of the lock rings 304*a*, 304*b* include the central lock bore 350. The central lock bore 350 includes the plurality of lock teeth 352, which matingly engage with the pin teeth 332 of the respective locator pin 302*a*, 302*b*.

With reference to FIG. 9, the load spreader retainer 306 includes the first retainer surface 360 opposite the second retainer surface 362, the first retainer end 364 opposite the second retainer end 366, and the retainer bore 368. The retainer pin 370 is coupled to the load spreader retainer 306 to transfer the force applied by the spring member 508 to the load spreader retainer 306, which transfers the force to the load spreaders 300*a*, 300*b*. With reference to FIG. 9, the first retainer pin end 380 is coupled to and in contact with a portion of the spring member 508 when the spring member 508 is coupled to the engine case 204. The first retainer pin end 380 transfers the force from the spring member 508 to the load spreader retainer 306 such that the second retainer surface 362 applies a force to the load spreaders 300*a*, 300*b* to maintain the load spreaders 300*a*, 300*b* in contact with the shroud 202. The second retainer pin end 382 includes the flange 384 that assists in retaining the retainer pin 370 within the retainer bore 368 such that the retainer pin 370 and the load spreader retainer 306 are coupled to the retainer pin 370 to move with the retainer pin 370.

Figure 10:
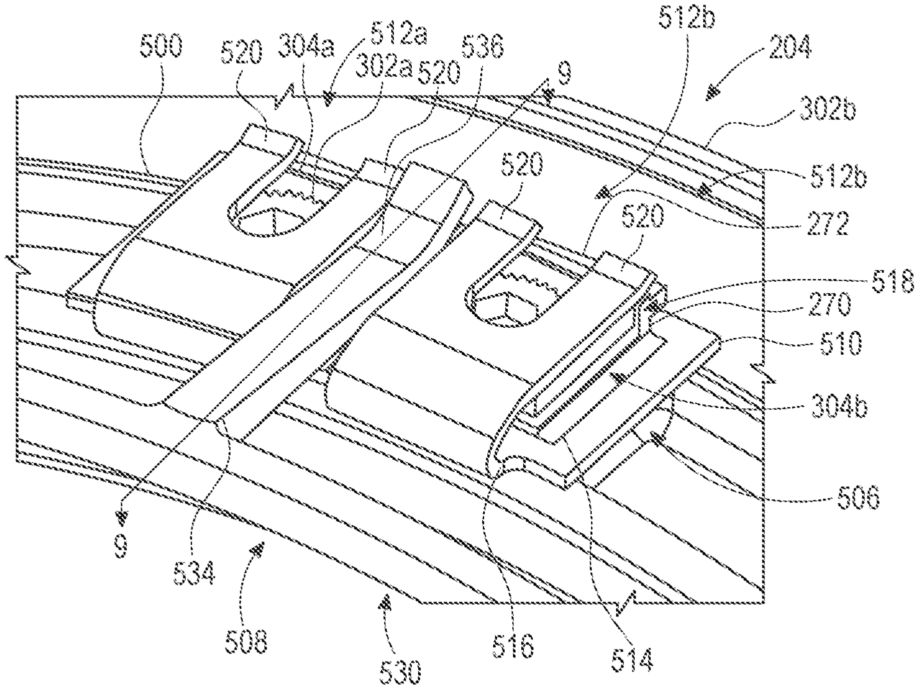
FIG. 10 is a detail view of the spring biased retention system of FIG. 7.

With reference to FIG. 8, the retainer 506 includes a base 510 and at least one or a pair of retainer clips 512*a*, 512*b*. The retainer 506 is composed of a metal or metal alloy, and may be cast, forged, stamped, machined, additively manufactured, etc. With reference to FIG. 10, the base 510 defines a substantially rectangular opening 514, which is sized to be coupled about the lock rings 304*a*, 304*b* and the mounting pad 256. Generally, the retainer 506 is coupled to the engine case 204 with a snap-fit, and the base 510 is forced over the triangular extensions 272. Each of the retainer clips 512*a*, 512*b* includes a first end 516 coupled to the base 510 and an opposite second end 518. The first end 516 is coupled to the base 510 such that each of the retainer clips 512*a*, 512*b* is cantilevered over a portion of the opening 514. The first end

516 is curved upon itself to form a biasing member or spring, which assists in coupling the retainer 506 to the mounting pad 256.

In one example, the second end 518 defines a pair of arms 520 separated by a slot 522. Each of the arms 520 contact a surface of the respective lock rings 304*a*, 304*b*, and apply a force to the lock rings 304*a*, 304*b* such that the lock rings 304*a*, 304*b* apply a force to the load spreaders 300*a*, 300*b* to maintain the load spreaders 300*a*, 300*b* in contact with the shroud 202. The slot 522 enables a tool to engage with the tool mating feature 334 to enable an adjustment of the locator pins 302*a*, 302*b*.

With reference to FIG. 8, the spring member 508 is annular, and is sized to be positioned about a portion of the engine case 204. The spring member 508 is composed of a metal or metal alloy, and may be cast, forged, stamped, machined, additively manufactured, etc. In one example, the spring member 508 includes a ring 530 and a plurality of coupling arms 532. The ring 530 is sized to circumscribe the portion of the engine case 204. The coupling arms 532 are coupled to the ring 530 so as to extend axially outward from a side of the ring 530. In this example, with reference to FIG. 9, each coupling arm 532 includes a first arm end 534 and an opposite, second arm end 536. The second arm end 536 acts as a spring arm. The first arm end 534 is coupled to the ring 530 such that the coupling arm 532 is cantilevered relative to the ring 530. The second arm end 536 is coupled to the retainer pin 370 or the engine case 204. The second arm end 536 applies a spring force to the retainer pin 370, which imparts a force to the load spreader retainer 306 during the thermal growth of the shroud 202. The load spreader retainer 306, in turn, imparts a force onto the load spreaders 300*a*, 300*b* to maintain contact between the load spreaders 300*a*, 300*b* and the shroud 202. Generally, the second arm end 536 is sized to be positioned between the lock rings 304*a*, 304*b*, and to have surface to surface contact with the first retainer pin end 380 of the retainer pin 370. A radial movement of the load spreaders 300*a*, 300*b* is inhibited by the spring force applied by the second arm end 536 to the load spreader retainer 306. By inhibiting the radial movement of the load spreaders 300*a*, 300*b*, wear on the second surface 212 of the shroud 202 is reduced.

In order to couple the shroud 202 to the engine case 204, in one example, with reference to FIGS. 3 and 5, the load spreaders 300*a*, 300*b* may be inserted on opposed sides of the first coupling tabs 226 and the second coupling tabs 236 such that the load spreaders 300*a*, 300*b* are positioned at about 0 degrees, about 90 degrees, about 180 degrees and about 270 degrees about the circumference of the shroud 202 from a top center of the shroud 202. With the retainer pin 370 coupled to the load spreader retainer 306, the load spreader retainer 306 may be positioned over the load spreaders 300*a*, 300*b*. With the spreader openings 318 coaxially aligned with the respective one of the coupling bores 264, 266, and the retainer pin 370 coaxially aligned with the third coupling bore 268, the shroud 202 and the load spreaders 300*a*, 300*b* may be coupled to the engine case 204 such that the retainer pin 370 is received through the third coupling bore 378. The locator pins 302*a*, 302*b*, are coupled to the respective one of the coupling bores 264, 266 so as to extend through the respective one of the coupling bores 264, 266, through the cutouts 372, 374 and into the respective spreader openings 318. The lock rings 304*a*, 304*b* are coupled to the locator pins 302*a*, 302*b* and rotated to position the respective load spreader 300*a*, 300*b* in contact with the second surface 212 of the shroud 202. Once the load spreaders 300*a*, 300*b* are in the proper orientation such that surface to surface contact is defined between the bottom spreader surface 312 and the second surface 212, the lock rings 304*a*, 304*b* are positioned into contact with the downstream walls 270 such that the downstream walls 270 inhibit the rotation of the lock rings 304*a*, 304*b*. The base 510 is coupled about the mounting pad 256 such that the retainer clips 512*a*, 512*b* are in contact with the lock rings 304*a*, 304*b*. The spring member 508 is coupled to the engine case 204 such that the second arm end 536 is in contact with the retainer pin 370 or the engine case 204. The first seal 222 and the cover ring 224 may be coupled to the shroud 202.

With the shroud 202 coupled to the engine case 204 via the spring biased shroud retention system 200, 500, the engine case 204 may be installed in the gas turbine engine 100 and coupled to a combustor case, for example, and the shroud 202 may be positioned about the intermediate pressure turbine 128 (FIG. 1). The source 248 of cooling fluid F may be fluidly coupled to the central pin bore 330 of the locator pins 302*a*, 302*b* to supply the cooling fluid F to the spreader plenum 316 and the impingement holes 319. With the shroud 202 and the engine case 204 installed within the gas turbine engine 100 to surround the intermediate pressure turbine 128 (FIG. 1), during operation of the gas turbine engine 100, due to the differences in the thermal growth rates of the materials that compose the shroud 202 and the engine case 204, the shroud 202 and the engine case 204 grow or expand at different rates. The spring biased shroud retention system 200, 500 maintains the radial and axial compliance of the shroud 202 as the shroud 202 and engine case 204 thermally grow. The spring member 308, 508 maintains the axial position of the load spreaders 300*a*, 300*b* during thermal growth by biasing the load spreaders 300*a*, 300*b* against the second surface 212 of the shroud 202 via the force applied by the second spring end 412 onto the retainer pin 370 or the second arm end 536 to the retainer pin 370, and thus, the load spreader retainer 306. Stated another way, the spring member 308, 508 inhibits the axial movement of the load spreaders 300*a*, 300*b*, which reduces wear on the second surface 212. In addition, the load spreaders 300*a*, 300*b* distribute the axial and the circumferential point load from the locator pins 302*a*, 302*b* over the load spreaders 300*a*, 300*b*, and thus, the second surface 212 of the shroud 202. By distributing the axial and the circumferential point load from the locator pins 302*a*, 302*b* over the load spreaders 300*a*, 300*b*, and thus, the second surface 212 of the shroud 202, a life of the shroud 202 is improved.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for coupling a shroud to a case associated with a gas turbine engine, comprising:
- the case having a mounting pad;
- the shroud having a surface that faces the case;
- a load spreader having a spreader surface in contact with the surface of the shroud;
- a locator pin coupled to the mounting pad and the load spreader to couple the shroud to the case;
- a load spreader retainer coupled to the load spreader, the load spreader retainer configured to distribute a force to the load spreader; and
- a biasing system coupled about the mounting pad that includes a spring arm configured to apply the force to the load spreader retainer to maintain the spreader surface of the load spreader in contact with the surface of the shroud.

2. The system of claim 1, wherein the shroud defines a first flange and a second flange that extend from the surface of the shroud, the shroud is composed of a ceramic based material and the load spreader is coupled between the first flange and the second flange.

3. The system of claim 2, further comprising a lock ring coupled to the locator pin, and the mounting pad includes a wall that inhibits a rotation of the lock ring.

4. The system of claim 3, wherein the biasing system is a biasing member that defines an opening sized to surround the mounting pad, and includes a clip arm that spans the opening and contacts the lock ring.

5. The system of claim 4, wherein the clip arm includes a notch configured to receive a portion of the spring arm.

6. The system of claim 3, wherein the biasing system includes a retainer and an annular biasing member, the retainer is coupled to the lock ring and the annular biasing member includes the spring arm.

7. The system of claim 1, wherein the mounting pad includes a wall that has an extension that extends axially from the wall, and the biasing system is coupled about the mounting pad so as to be at least partially retained by the extension.

8. The system of claim 1, wherein the load spreader is hollow and defines a plenum.

9. The system of claim 8, wherein the locator pin defines a central cooling bore that is in fluid communication with the plenum and is configured to be coupled to a source of a cooling fluid.

10. The system of claim 9, wherein the spreader surface defines a plurality of impingement holes configured to direct the cooling fluid onto the surface of the shroud.

11. The system of claim 1, wherein a retainer pin couples the load spreader retainer to the mounting pad, and the spring arm is configured to apply the force to an end of the retainer pin.

12. A gas turbine engine comprising:
- a case having a mounting pad;
- a shroud having a surface;
- a first load spreader having a first spreader surface in contact with the surface of the shroud;
- a second load spreader having a second spreader surface in contact with the surface of the shroud, and the second load spreader is spaced apart from the first load spreader on the surface of the shroud;
- a first locator pin coupled to the mounting pad and the first load spreader to couple the shroud to the case;
- a second locator pin coupled to the mounting pad and the second load spreader to couple the shroud to the case;
- a load spreader retainer coupled to the first load spreader and the second load spreader, the load spreader retainer configured to distribute a force to the first load spreader and the second load spreader; and
- a biasing system coupled about the mounting pad that includes a spring arm configured to apply the force to the load spreader retainer to maintain the first spreader surface of the first load spreader and the second spreader surface of the second load spreader in contact with the surface of the shroud.

13. The gas turbine engine of claim 12, wherein the shroud defines a first flange and a second flange that extend from the surface of the shroud, the shroud is composed of a ceramic based material and the first load spreader and the second load spreader are coupled between the first flange and the second flange.

14. The gas turbine engine of claim 13, further comprising a first lock ring coupled to the first locator pin, a second lock ring coupled to the second locator pin, and the mounting pad includes a pair of walls that inhibit a rotation of the first lock ring and the second lock ring.

15. The gas turbine engine of claim 14, wherein each wall of the pair of walls includes an extension that extends axially, and the biasing system is coupled about the mounting pad so as to be at least partially retained by the extension.

16. The gas turbine engine of claim 14, wherein the biasing system is a biasing member that defines an opening sized to surround the mounting pad, includes a clip arm that spans the opening and contacts the first lock ring and the second lock ring, and the clip arm defines a notch configured to receive a portion of the spring arm.

17. A gas turbine engine, comprising:
- a case having a mounting pad;
- a shroud having a surface;
- a load spreader having a spreader surface in contact with the surface of the shroud, the load spreader is hollow and defines a plenum; and
- a locator pin coupled to the mounting pad and the load spreader to couple the shroud to the case, the locator pin defining a central cooling bore that is in fluid communication with the plenum and is configured to be coupled to a source of a cooling fluid, and the spreader surface defines a plurality of impingement holes configured to direct the cooling fluid onto the surface of the shroud.

18. The gas turbine engine of claim 17, further comprising:
- a load spreader retainer coupled to the load spreader, the load spreader retainer configured to distribute a force to the load spreader; and a biasing system coupled about the mounting pad that includes a spring arm configured to apply the force to the load spreader retainer to maintain the spreader surface of the load spreader in contact with the surface of the shroud.

19. The gas turbine engine of claim 18, wherein the shroud defines a first flange and a second flange that extend from the surface of the shroud, the shroud is composed of a ceramic based material and the load spreader is coupled between the first flange and the second flange.

20. The gas turbine engine of claim 19, further comprising a lock ring coupled to the locator pin, and the mounting pad includes a wall that inhibits a rotation of the lock ring.

* * * * *